United States Patent [19]

Fritz et al.

[11] Patent Number: 5,515,768
[45] Date of Patent: May 14, 1996

[54] SLIPPER HOLDDOWN DEVICE FOR AN AXIAL PISTON PUMP

[75] Inventors: Wayne E. Fritz, Joliet; Thomas A. Watts, Ottawa; Phillip J. Wenger, Naperville, all of Ill.

[73] Assignee: Caterpillar Inc., Peoria, Ill.

[21] Appl. No.: 396,302

[22] Filed: Feb. 28, 1995

[51] Int. Cl.⁶ .............................. F01B 3/00; F01B 13/04; F01B 1/26
[52] U.S. Cl. .............................. 92/71; 91/505; 417/222.1
[58] Field of Search .............................. 92/71, 70, 12.2; 91/505, 506; 417/222.1

[56] References Cited

U.S. PATENT DOCUMENTS

| | | | |
|---|---|---|---|
| 3,739,691 | 6/1973 | Bobier | 91/506 |
| 3,893,375 | 7/1975 | Hein et al. | |
| 4,581,980 | 4/1986 | Berthold | 92/12.2 |
| 4,615,257 | 10/1986 | Valentin | 91/505 X |
| 4,620,475 | 11/1986 | Watts | 92/57 X |
| 4,710,107 | 12/1987 | Kanies | 91/506 X |
| 5,017,096 | 5/1991 | Sugiura et al. | 417/222.2 |
| 5,251,537 | 10/1993 | Hoshino et al. | 91/506 |
| 5,279,205 | 1/1994 | Carlson, Jr. et al. | 91/485 |
| 5,406,878 | 4/1995 | Freeman et al. | 92/12.2 |

FOREIGN PATENT DOCUMENTS 5-164038  6/1993  Japan ................................ 417/222.1

*Primary Examiner*—John E. Ryznic
*Attorney, Agent, or Firm*—John W. Grant

[57] ABSTRACT

An axial piston hydraulic device includes a holddown device for maintaining the slippers swivably connected to pistons in sliding contacting with a cam surface of a swashplate. The holddown device also includes a nested wave spring disposed to resiliently urge a holddown sleeve away from a cylinder barrel for biasing a holddown plate engaging the slippers toward the cam surface.

5 Claims, 1 Drawing Sheet

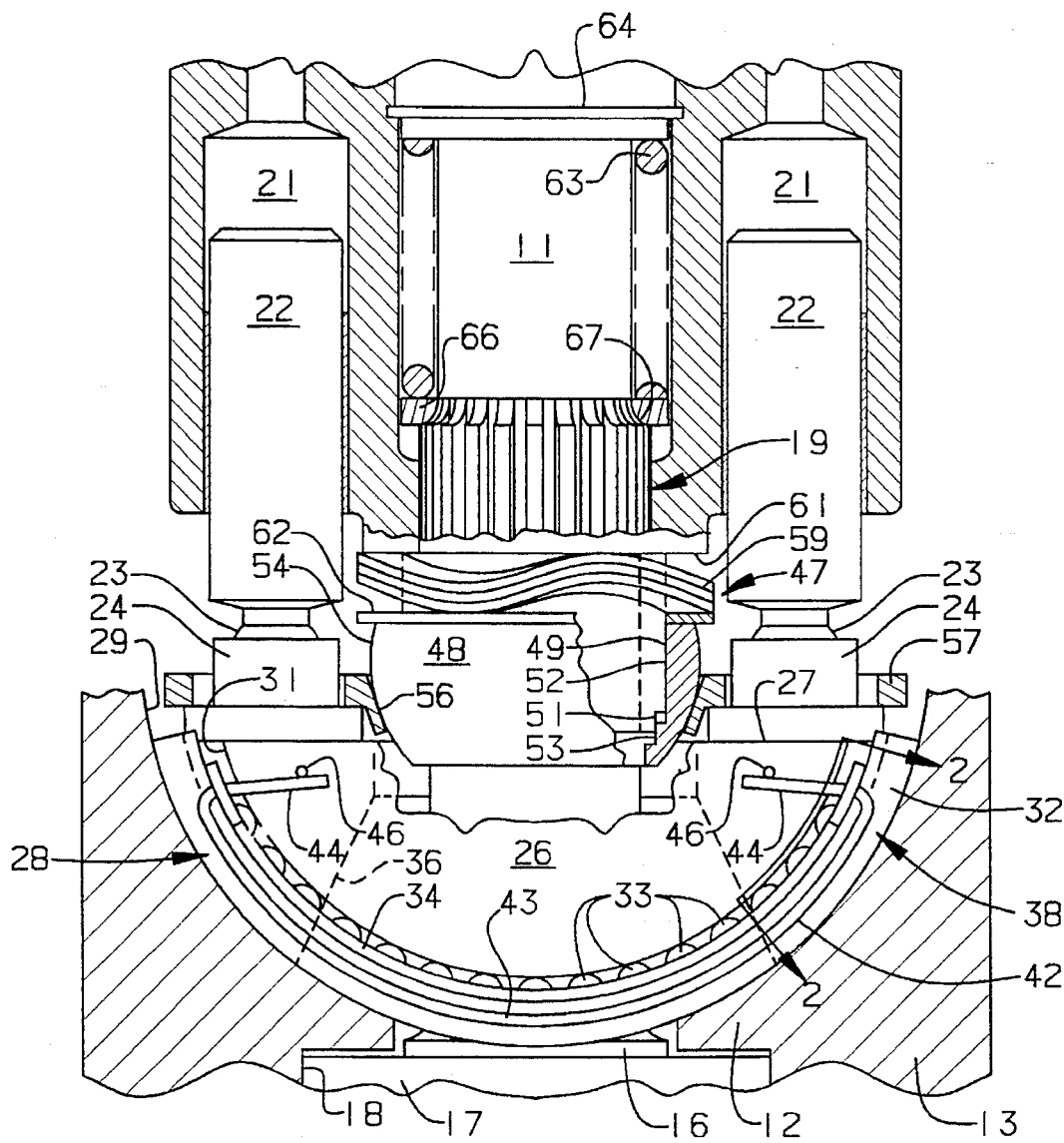
Fig_1_
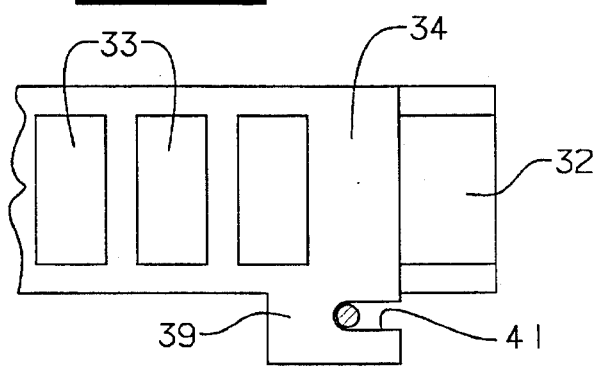
Fig_2_ ns,768

SLIPPER HOLDDOWN DEVICE FOR AN AXIAL PISTON PUMP

TECHNICAL FIELD

This invention relates generally to a hydraulic axial cylinder device and more particularly to the use of a specific type of holddown spring for holding the slippers in contact with the swashplate.

BACKGROUND ART

Variable displacement axial piston hydraulic units utilize a tiltable swashplate to control the displacement of pistons reciprocatably positioned within a rotating cylinder barrel. Fixed displacement axial piston hydraulic units use a fixed swashplate to define the units displacement. Each of the pistons commonly have a protruding end swivably connected to a slipper seated against a cam surface on the swashplate. One of the problems encountered therewith is that during operation the slippers are sometimes subjected to forces tending to lift the slipper pads off the cam surface. Such liftoff forces are generated by centrifugal forces and low inlet pressures that create suction at the top of the piston during the inlet portion of the stroke.

This problem is generally solved by the use of a holddown spring which resiliently biases the slippers toward the cam surface through a holddown plate. Belleville springs are widely used as the holddown spring since they can generally create relatively high loads in a fairly short axial length. However, the disadvantage of using Belleville springs is that they usually require stacking several Belleville springs in a predetermined sequence thereby introducing the likelihood of assembly errors. Another problem is that the spring force exerted by Belleville springs are concentrated in a narrow, annular contact band at the edges thereof. This leads to premature wear to the contact bands which quickly causes a shortening of the axial lengths of the stack of springs. Shortening the length of the stack of Belleville springs greatly decreases the holddown forces exerted on the slippers.

In view of the above, it would be desirable to have a slipper holddown device that utilizes a single spring for minimizing assembly errors while providing relatively high loads in a small package without concentrating the forces in a relatively narrow contact band.

DISCLOSURE OF THE INVENTION

In one aspect of the present invention, an axial piston hydraulic device has a housing, a driveshaft extending into the housing and being journaled thereto for rotation about a longitudinal axis, a cylinder barrel disposed in the housing in coaxial relationship to the driveshaft and being coupled thereto for rotation about the axis, the barrel having a plurality of angular spaced cylinder bores extending parallel to the axis, a swashplate having an annular caming surface facing the barrel, a plurality of pistons each being disposed in an individual one of the cylinder bores for reciprocation therein and having an end protruding from the barrel, a plurality of slipper pads individually, swivably connected to the protruding ends of the pistons, an annular holddown sleeve coaxially disposed around the shaft and being axially movable relative to the barrel, the sleeve having a spherical shaped outer surface, an annular holddown plate overlapping the slippers and having an inner annular surface in engagement with the outer surface of the sleeve, and a nested wave spring disposed to resiliently urge the sleeve away from the barrel to hold the slippers against the cam surface.

BRIEF DESCRIPTION OF THE DRAWINGS

FIG. 1 is a sectional view of a hydraulic unit utilizing the present invention; and FIG. 2 is a partial sectional view taken generally along lines 2—2 of FIG. 1.

BEST MODE FOR CARRYING OUT THE INVENTION

A hydraulic device 10 of the axial piston variable displacement type may be adapted to function either as a pump or a motor as is well understood in the art. To facilitate description, the device 11 will be herein referred to as a pump and described with reference to this mode of operation, it being apparent that the invention is equally applicable to motors of the variable displacement, axial piston form and to fixed displacement axial piston pumps and motors.

The pump 10 has a rotary drive shaft 11 which extends through one end wall 12 of a housing partially shown at 13 to support and drive an annular cylinder barrel 14. The driveshaft 11 may be coupled to a driving engine in any suitable known manner and has a flange 16 abutting a bearing 17 seated in a bore 18 in the end wall 12. The driveshaft 11 is disposed along a longitudinal axis.

The barrel 14 is disposed within the housing 13 in coaxial relation to the shaft 11 and is coupled thereto by a spline connection 19 for rotation about the axis. The barrel has a plurality of angular spaced cylinder bores 21 which extend parallel to the axis of the barrel. Each of a plurality of cylindrical pistons 22 are disposed in an individual one of the cylinder bores for reciprocation therein and have an end 23 protruding from the barrel. A plurality of slippers 24 are individually swivably connected to the protruding ends of the pistons in the usual manner.

A cradle swashplate 26 is positioned within the housing and is adapted for tilting or pivotable movement induced by an input mechanism (not shown). The swashplate has a planar cam surface 27 facing the barrel 14 and engaged by the slippers 24 so that the tilting movement of the swashplate controls the axial displacement of the pistons.

The cradle swashplate 26 is mounted in the housing by a pair of roller bearing assemblies one of which is shown at 28 positioned between an arcuate concave surface 29 provided in the housing and an arcuate convex surface 31 on the swashplate. Each of the roller bearing assemblies includes an outer race 32 seated in the concave surface 29 and a plurality of rollable elements such as rollers 33 and a bearing cage 34 to maintain arcuate spacing between the individual rollers 33. The swashplate 26 is provided with a central opening 36 which permits passage of the shaft through the center of the swashplate.

A flexible retainer mechanism 38 includes a pair of tabs 39 extending laterally from the bearing cage 34 with each tab having an opening therein in the form of an elongate slot 41. A flexible retainer 42 has an arcuate central section 43 concentric with the bearing cage 34 and a pair of inwardly extending end portions 44 passing through the slots 41 for attaching the retainer to the bearing cage. The end portions 44 resiliently engage a pair of anchor pins 46 extending outwardly from the swashplate. The spring is preferably made from a spring material such as spring steel or the like.

A resilient holddown device 47 is provided to maintain the slippers 24 in contact with the cam surface 27 and includes an annular holddown sleeve 48 having a pair of concentric bores 49,51 slidably disposed on matching cylindrical surfaces 52,53, respectively. The sleeve is coaxially disposed around the driveshaft and has a spherical shaped outer surface 54 in engagement with an inner annular surface 56 of a annular holddown plate 57. The holddown plate 57 extends radially outwardly to overlap each of the slippers 24. The inner surface 56 in this embodiment is a frustoconical shaped surface.

A nested wave spring 59 is disposed between an annular shoulder 61 on the barrel 14 and an annular washer 62 in abutment with the holddown sleeve 48 to resiliently urge the sleeve away from the barrel to hold the slipper pads against the cam surface.

A coil spring 63 is disposed coaxially around the driveshaft 11 within the barrel 14 and acts between a snap ring 64 engaged in the barrel and a retainer ring 66 seated on an annular shoulder 67 provided at the ends of the spline formed on the driveshaft.

Industrial Applicability

In use, the nested wave spring 59 acts between the barrel 14 and the holddown sleeve 48 to urge the sleeve away from the barrel. This in turn resiliently urges the hold down plate 57 toward the swashplate 26 to maintain the slippers 24 in sliding contact with the cam surface 27. The spherical surface 54 of the holddown sleeve and the frustoconical inner surface 56 of the holddown plate permit the holddown plate to tilt with the swashplate while maintaining the slippers in contact with the cam surface.

In view of the above, it is readily apparent that the use of the nested wave spring advantageously provides relatively high holddown forces in a relatively short axial length to permit the length of the pump to be shortened. Moreover the forces are transmitted through a relatively large contact surface to minimize wear so that the effective length of the spring and thus the spring force remain substantially constant throughout the life of the pump. Finally, since the nested wave spring is a one-piece spring, the likelihood of assembly errors is minimized.

Other aspects, objects, and advantages of this invention can be obtained from a study of the drawings, the disclosure, and the appended claims.

We claim:

1. A axial piston device comprising:

a housing;

a driveshaft extending into the housing and being journaled thereto for rotating about a longitudinal axis;

an annular barrel disposed in the housing in coaxial relationship to the driveshaft and being coupled thereto for rotation about the axis, the barrel having a plurality of angular spaced cylinder bores extending parallel to the axis;

a plurality of pistons each being disposed in individual ones of the cylinder bores for reciprocation therein and having an end protruding from the barrel;

a swashplate having an annular cam surface facing the barrel;

a plurality of slippers individually swivably connected to the projecting ends of the pistons and slidably engaging the cam surface;

an annular holddown sleeve coaxially disposed around the driveshaft and being axially movable relative to the barrel, the sleeve having an spherical shaped outer surface;

an annular holddown plate having an inner annular surface in engagement with the outer surface of the sleeve, the plate being disposed to overlap the slippers; and a wave spring disposed to resiliently urge the sleeve away from the barrel to hold the slipper pads against the cam surface.

2. The axial piston device of claim 1, wherein the barrel has a cylindrical portion and the sleeve has a cylindrical bore slidably disposed on the cylindrical portions.

3. The axial piston device of claim 1, wherein the barrel has an annular shoulder engaged by the wave spring and including a washer disposed between the sleeve and the spring.

4. The axial piston device of claim 1, wherein the inner surface in the holddown plate is a frustoconical surface.

5. The axial piston device of claim 1, wherein the wave spring is a nested wave spring.

* * * * *